July 7, 1931.   H. T. DARLINGTON   1,813,117
APPARATUS FOR TREATING, DISTILLING, AND DECOMPOSING HYDROCARBON OILS
Original Filed April 25, 1927   5 Sheets-Sheet 5
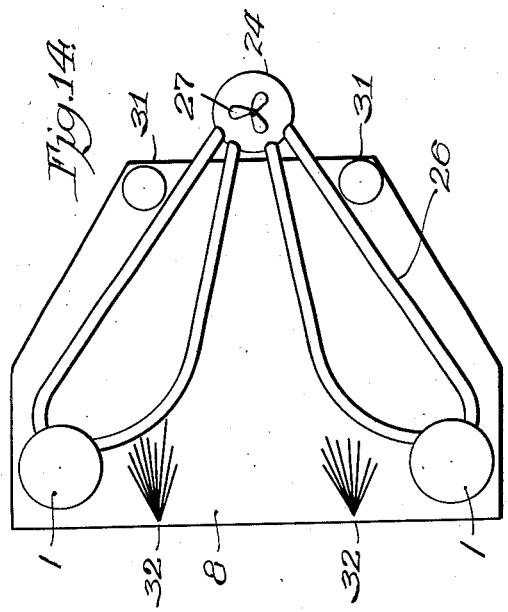
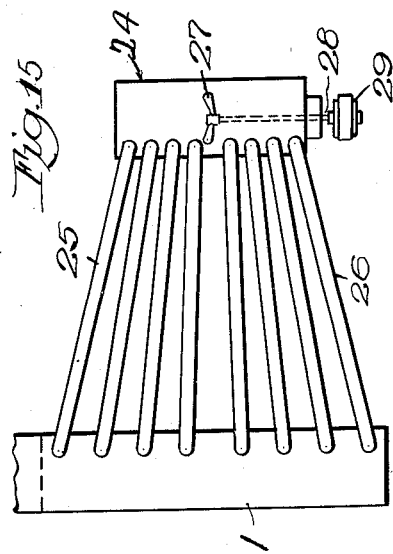
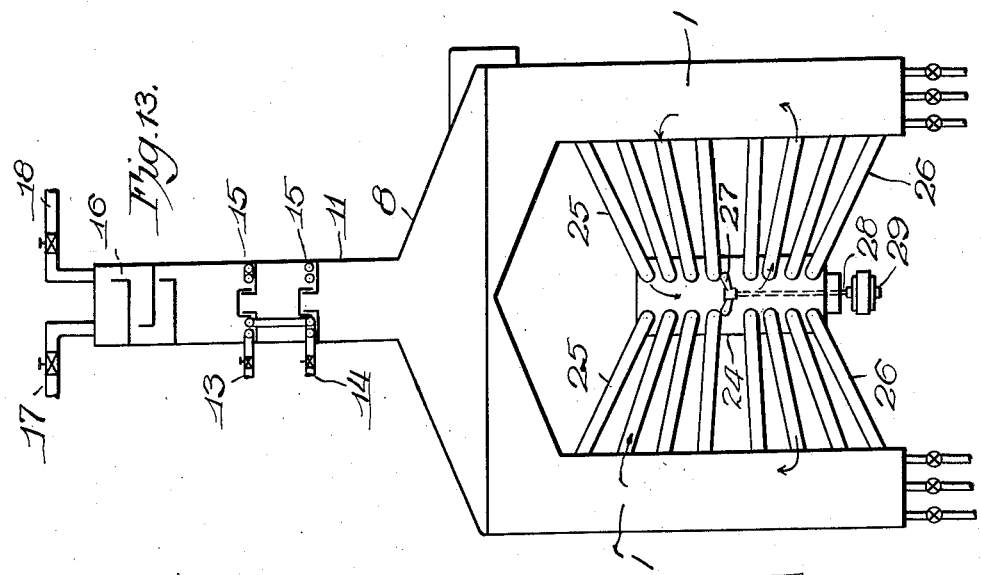
Witness:
Inventor,
Homer T. Darlington.

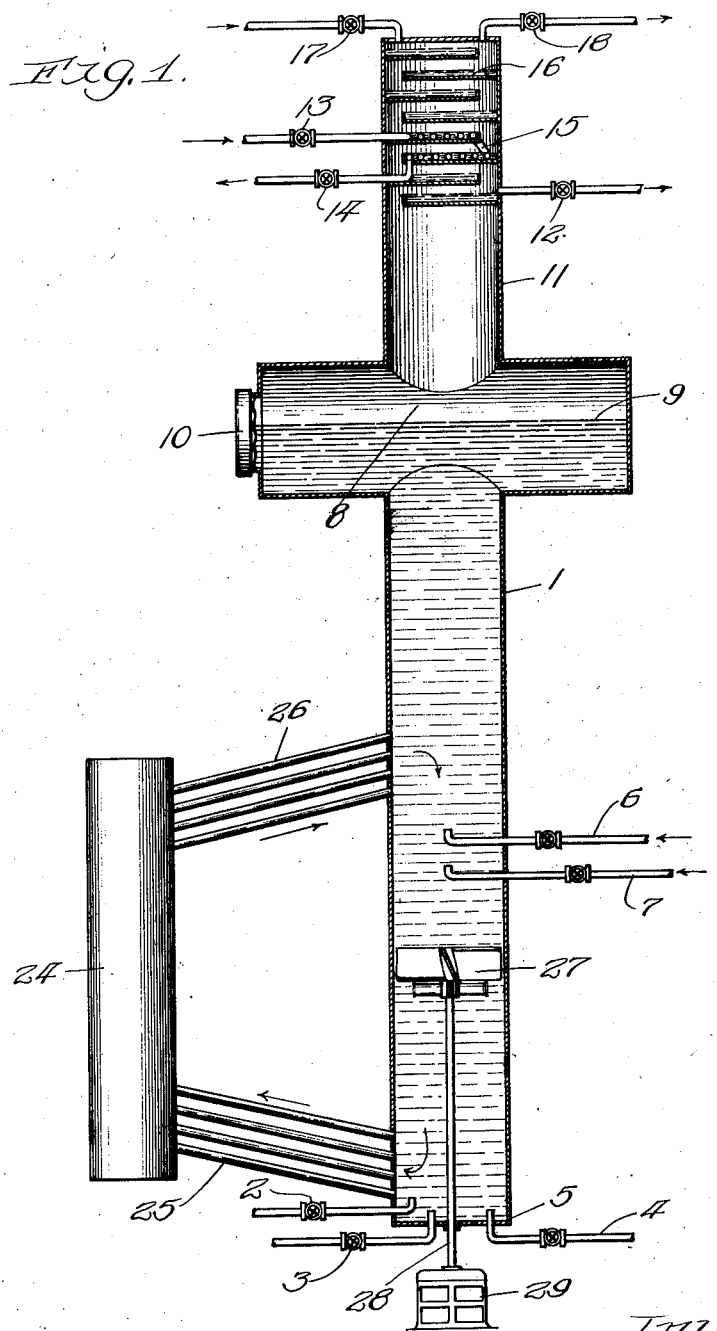

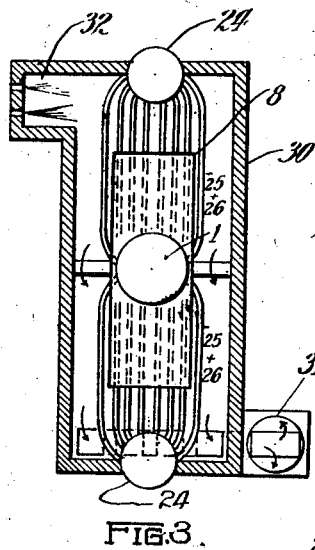
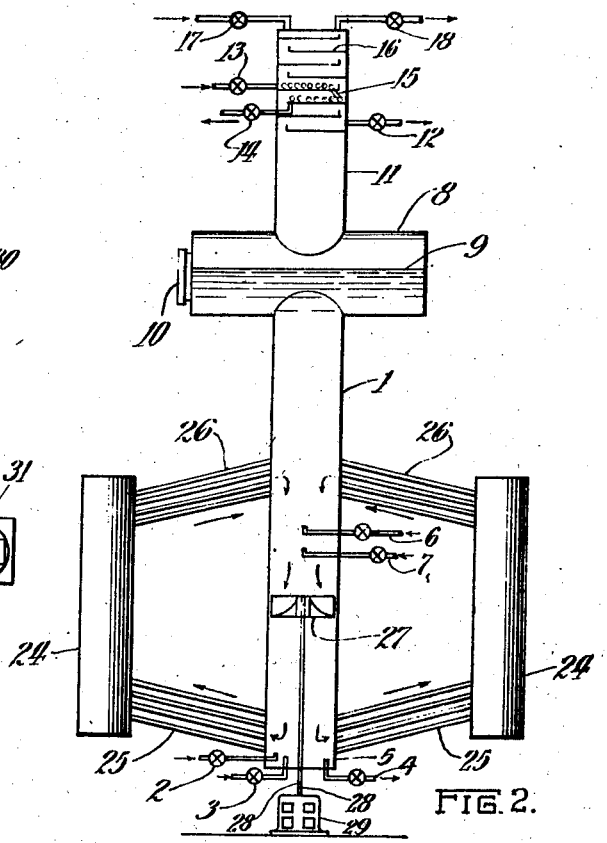
FIG. 3.
FIG. 2.
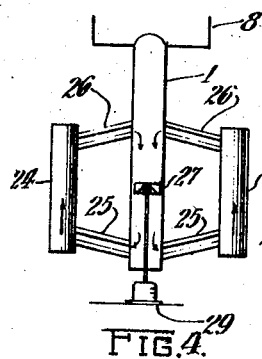
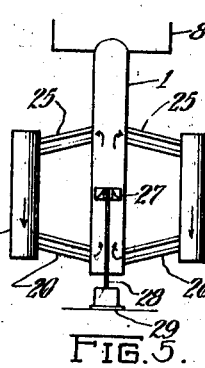
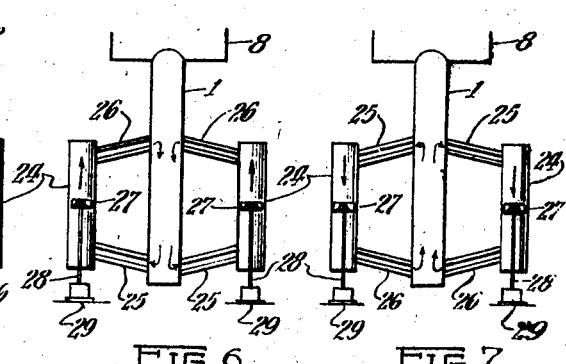
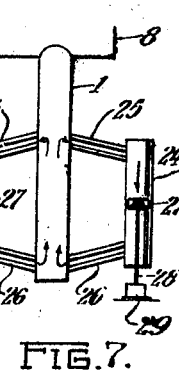
FIG. 4.   FIG. 5.   FIG. 6.   FIG. 7.

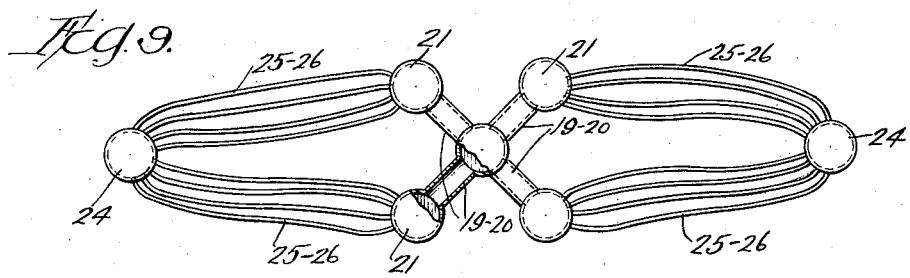
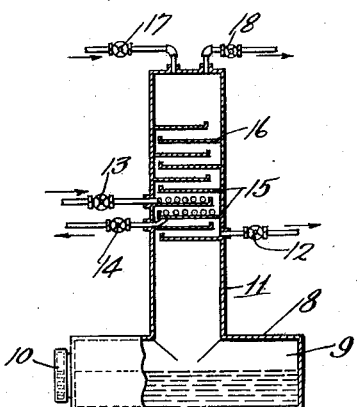
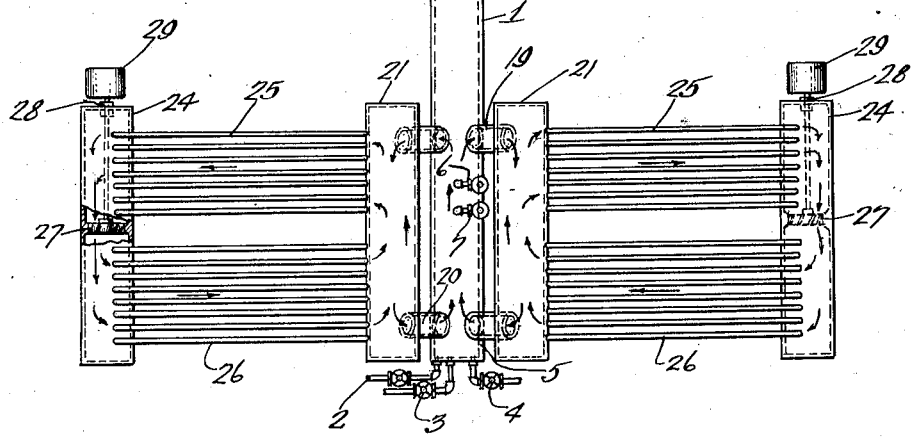

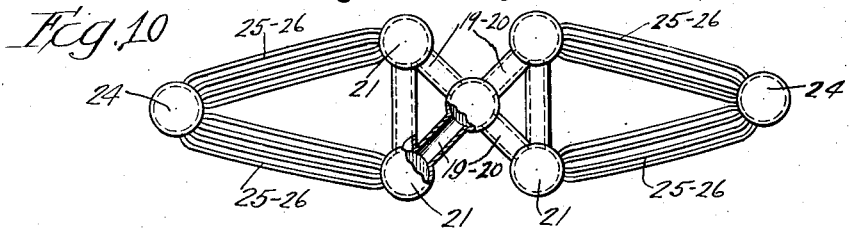
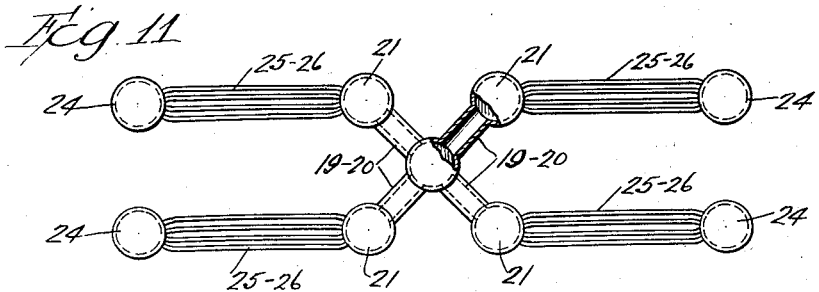
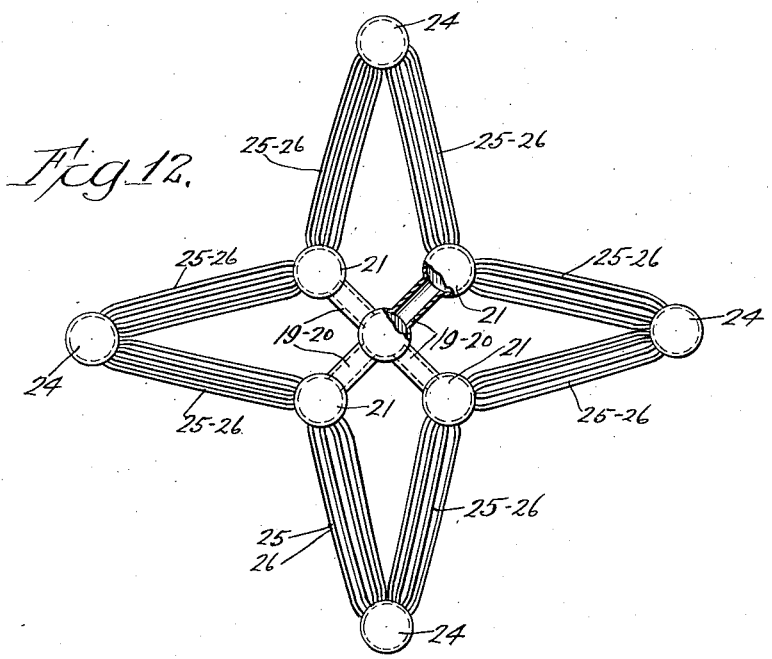

Patented July 7, 1931

1,813,117

UNITED STATES PATENT OFFICE

HOMER T. DARLINGTON, OF WEST CHESTER, PENNSYLVANIA, ASSIGNOR TO MARTIN B. SCHUSTER, OF JOLIET, ILLINOIS, TRUSTEE

APPARATUS FOR TREATING, DISTILLING AND DECOMPOSING HYDROCARBON OILS

Continuation of application Serial No. 186,466, filed April 25, 1927. This application filed June 24, 1929. Serial No. 373,394.

This application is a continuation of my application Serial No. 186,466, filed April 25, 1927.

This invention relates to an apparatus for distilling and decomposing hydrocarbon oils, and particularly for cracking such oils.

One of the objects of the invention is to provide an improved heating unit for heating hydrocarbon oil, and particularly for cracking such oils.

A further object of the invention is to provide an apparatus comprising a chamber connected with one or more heating units of large heating capacity adapted to permit large volumes of hydrocarbons to be circulated rapidly therethrough.

A further object of the invention is to provide a distilling or cracking apparatus comprising a main chamber provided with one or more heating units comprising heating tubes entering said chamber, of such construction that a greater number of such tubes may be provided than heretofore.

Other objects and advantages will appear from the following description of preferred embodiments of the invention taken in conjunction with the accompanying drawings, in which—

Figure 1 is a diagrammatic elevational view of an apparatus embodying my invention provided with a single heating unit;

Fig. 2 is a similar view showing an apparatus provided with two heating units;

Fig. 3 is a diagrammatic plan view of the apparatus shown in Fig. 2, the heating furnace being shown in horizontal section;

Figs. 4 to 7 are diagrammatic views similar to Fig. 1 showing modifications of the oil circulation;

Fig. 8 is a diagrammatic elevational view of an apparatus embodying my invention provided with a pair of modified heating units;

Figs. 9, 10, 11 and 12 are plans of modified forms of the apparatus shown in Fig. 8;

Fig. 13 is a diagrammatic elevational view of a further modified apparatus embodying my invention;

Fig. 14 is a diagrammatic sectional plan thereof; and

Fig. 15 is a side elevational detail of the lower portion thereof.

Referring to the drawings, and particularly Fig. 1 thereof, the apparatus comprises a main chamber 1, which is preferably a long vertical tubular chamber. Said chamber is provided with alternate means 2 and 6 for the introduction of charging stock, alternate means 3 and 7 for the introduction of a catalyst, steam, a gas, a treatment agent, or two or more of these, either in combination or succession, and a valved outlet 4 for withdrawing solid or other residue.

The heating unit comprises a plurality and preferably a large number of outgoing heating tubes 25 which are connected into the chamber 1 and into an elongated tubular chamber 24 spaced apart from the chamber 1 and a plurality, and preferably a large number of return tubes 26 also connected into the chambers 1 and 24. Below the tubes 25 and 26 the chamber 1 is provided with a non-circulatory zone or pool 5 from which residue may be withdrawn.

Circulation through the tubes 25, chamber 24, tubes 26 and the portion of the chamber, between the connections of said tubes therewith is induced, controlled and directed by any suitable mechanical means, preferably a pump 27, of the centrifugal or impeller type which positively circulates the hydrocarbon oil in the desired direction. The pump 27 is operated by a motor 29 through the shaft 28.

The main chamber 1 is provided above the circulating zone with a region relatively free from circulation, which may suitably be constituted by a drum 8 in which an oil level 9 is maintained. Above and connected with the non-circulating zone is a dephlegmating or fractionating tower 11, which is preferably a continuation of the main chamber 1 and in communication therewith. The dephlegmating or fractionating tower 11 is provided with suitable means for partially condensing the upwardly moving vapors and bringing them into intimate contact with descending liquid. Such means are diagrammatically shown as baffle plates or trays 16 and cooling trays 15. For cooling the section 11 a valved pipe 17 may be provided whereby distillate of suitable character may be supplied to the trays 15 and 16 and caused to run downwardly thereover. As a further or alternative means for cooling the section 11 a closed coil is provided therein, said coil being preferably located below the liquid level in one or more of the trays 15. Said coil is provided with valved connections 13 and 14 whereby cooling medium may be circulated therethrough.

Vapors are withdrawn from the top of the dephlegmating or fractionating section 11 by the valved pipe 18 and means may be provided, for example, valved pipe 12 whereby distillate may be withdrawn from one or more of the trays 15, 16.

As will appear from the following description, two or more heating units may be combined with a single main chamber, being preferably located in substantially radial relation thereto. Thus in the modification shown in Fig. 2, the main chamber 1 is provided with two heating units each comprising outgoing tubes 25, tubular chamber 24 and return tubes 26.

As shown in Fig. 3, the tubes 25 and 26 may be located around substantially the whole circumference of the main chamber 1, and preferably said tubes are bent so that they are substantially normal to the surfaces of the chambers 1 and 24 to which they are connected. The bending of the tubes is also desirable since it enables said tubes to become distorted by expansion, thereby avoiding excessive fracturing forces in the apparatus.

Fig. 3 also illustrates a suitable furnace 30 for heating the heating units, and preferably also the circulatory part of the main chamber 1 with which they are associated. Said furnace is provided with a stack 31 and a firebox 32. It will be understood that any other suitable means may be employed for heating the heating units.

Figs. 4, 5, 6 and 7 show diagrammatically various modifications of oil circulation through the heating units. As shown in Fig. 4, the pump 27 may be arranged in the main chamber 1 so as to pump the oil downwardly therein. In this case the outgoing tubes 25 are located below the return tubes 26. As shown in Fig. 5, the pump 27 is adapted to pump the oil upwardly in the chamber 1 so that the outgoing tubes 25 are located above the return tubes 26. As shown in Figs. 6 and 7, pumps 27 may be provided in the tubular chambers 24. As shown in Fig. 6, the pumps may be adapted to pump the oil upwardly so that the outgoing tubes 25 are below the return tubes 26, and as shown in Fig. 7, the direction of operation of the pumps and the relative position of the tubes 25 and 26 may be reversed.

As shown in Figs. 1 to 7 and 13 to 15, the tubes 25 and 26 may connect directly into the main chamber. If desired, however, said tubes may connect into one or more intermediate chambers 21, which are also preferably tubular in form and located adjacent to the main chamber 1, being connected thereto by suitable connections 19 and 20. The main chamber 1, intermediate chambers 21, tubes 25 and 26, and chambers 24 may be combined and connected in many different ways, some of which are diagrammatically illustrated in Figs. 9 to 12.

In the form shown in Figs. 13 to 15, the lower portion of the chamber 1 is bifurcated, both bifurcated portions being connected by the tubes to the chamber 24.

In operation, whatever the variation in the form of the apparatus, hydrocarbon oil charging stock is fed to the principal chamber 1 and circulated therefrom in directed and controlled streams to and through the outgoing heating tubes 25, either directly or through the intermediate chambers 21, to the chamber or chambers 24 where liquid from one group of tubes 25 or, as shown in Fig. 2, from two groups of such tubes, or, if desired, from a greater number of groups of such tubes, is commingled. Thence the oil returns through one or more groups of tubes 26 to the main chamber 1, where the oil therefrom is commingled. The oil thus heated is raised to, or maintained at cracking temperature. Lighter oil accumulates in the non-circulatory zone of the chamber 1 above the heating tubes and part thereof evaporates from the liquid surface 9. The vapors therefrom pass upwardly through the fractionating or dephlegmating zone 11, from which reflux returns to the body of oil in the chamber 1. The uncondensed vapors pass out through the pipe 18 to a suitable condenser (not shown). Any desired pressure may be maintained within the chamber 1 and communicating parts by means of the valve in the pipe 18 or valves in the overhead system therebeyond.

The circulatory portion of the main chamber 1, the vaporizing zone 8 and the fractionating zone 11 are so placed in relation to each other that condensate is automatically and gravitationally returned without leaving the main chamber. This construction is not claimed broadly herein, being claimed broadly in my pending application for Letters Patent of the United States, Serial No. 186,465, filed April 25, 1927.

The apparatus described provides an apparatus for making low-boiling-point hydrocarbons that has many advantages over apparatus heretofore used. It is especially adapted for continuous operation and is capable of very simple control. Heat is conserved by the manner in which the oil is intercirculated, and fuel may be conserved by arranging the circulating units that one source of heat will serve several groups of tubes.

Forced circulation induced by a centrifugal or other impeller type of pump through the heating tubes, and the commingling of several or many streams in the various chambers have a tendency to prevent the deposit of carbon and to make the cracking reaction more uniform and rapid. Furthermore, owing to the large capacity of the heating unit or units, it is possible to force large volumes of oil rapidly therethrough with moderate pressure differential.

I claim:

1. A new and improved apparatus for the treatment of hydrocarbon oils comprising a vertically disposed main chamber of cylindrical formation and a heating unit for heating said oils comprising a header in the form of a vertically disposed cylindrical chamber standing in substantially parallel and spaced relation to the main chamber, a group of heating and circulating tubes extending from one end of said header and communicating with a corresponding portion of the main chamber, and a second group of heating and circulating tubes extending from the other end of said header and communicating with a corresponding portion of the main chamber, and means for heating said tubes.

2. A new and improved apparatus for the treatment of hydrocarbon oils comprising a main chamber and a heating unit for heating said hydrocarbon oils, said unit comprising a vertical header, a lower group of heating and circulating tubes extending from one end of said header and communicating with a corresponding portion of the main chamber, and a higher group of heating and circulating tubes extending from the other end of said header and communicating with a corresponding portion of the main chamber, means for heating said tubes, and mechanical means for inducing, controlling and directing circulation of said oils through said heating unit.

3. A new and improved apparatus for the treatment of hydrocarbon oils comprising a vertically disposed main chamber of cylindrical formation and a heating unit for heating said oils comprising a header in the form of a vertically disposed cylindrical chamber standing in substantially parallel and spaced relation to the main chamber, a group of heating and circulating tubes extending from one end of said header and communicating with a corresponding portion of the main chamber, and a second group of heating and circulating tubes extending from the other end of said header and communicating with a corresponding portion of the main chamber, means for heating said tubes, and mechanical means for inducing, controlling and directing circulation of said oils through said heating unit.

4. A new and improved apparatus for treatment of hydrocarbon oils comprising a main chamber and a heating unit for heating said hydrocarbon oils, said unit comprising an elongated header, a group of heating and circulating tubes extending from one end of said header and communicating with a corresponding portion of the main chamber, and a second group of heating and circulating tubes extending from the other end of said header and communicating with a corresponding portion of the main chamber, means for heating said tubes, and a pump for positively circulating such oils through said unit and through part of said main chamber.

5. A new and improved apparatus for the treatment of hydrocarbon oils comprising a vertically disposed main chamber, a heating unit for said hydrocarbon oils comprising a header in the form of a vertically disposed chamber spaced apart from said main chamber, a group of heating and circulating tubes extending from one end of said header and communicating with a corresponding portion of the main chamber, and a second group of heating and circulating tubes extending from the other end of said header and communicating with a corresponding portion of the main chamber, means for heating said tubes, the main chamber extending below said tubes to provide a pool for the accumulation of heavy material.

6. A new and improved apparatus for the treatment of hydrocarbon oils comprising a vertically disposed main chamber, a heating unit for said hydrocarbon oils comprising a header in the form of a vertically disposed chamber spaced apart from said main chamber, a group of heating and circulating tubes extending from one end of said header and communicating with a corresponding portion of the main chamber, and a second group of heating and circulating tubes extending from the other end of said header and communicating with a corresponding portion of the main chamber, means for heating said tubes, the main chamber extending below said tubes to provide a pool for the accumulation of heavy material, and extending upwardly above said tubes to provide a vapor releasing zone.

7. A new and improved apparatus for the treatment of hydrocarbons comprising a main chamber, a plurality of heating units for heating hydrocarbons, said units being arranged in radial relation with respect to the main chamber, each unit comprising a header, a group of heating and circulating tubes extending from one end of said header and communicating with a corresponding portion of the main chamber, and a second group of heating and circulating tubes extending from the other end of said header and communicating with a corresponding portion of the main chamber, and means for heating the tubes of each unit.

8. A new and improved apparatus for the treatment of hydrocarbons comprising a vertically disposed main chamber of cylindrical formation, a plurality of heating units for heating hydrocarbons, said units being arranged in radial relation with respect to the main chamber, each unit comprising a header in the form of a vertically disposed cylindrical chamber standing in substantially parallel relation to the main chamber, a group of heating and circulating tubes extending from one end of said header and communicating with a corresponding portion of the main chamber, and a second group of heating and circulating tubes extending from the other end of said header and communicating with a corresponding portion of the main chamber, and means for heating the tubes of each unit.

9. A new and improved apparatus for the treatment of hydrocarbons comprising a main chamber, a plurality of heating units for heating hydrocarbons, said units being arranged in radial relation with respect to the main chamber, each unit comprising a header, a group of heating and circulating tubes extending from one end of said header and communicating with a corresponding portion of the main chamber, and a second group of heating and circulating tubes extending from the other end of said header and communicating with a corresponding portion of the main chamber, means for heating the tubes of each unit, and mechanical means for inducing, controlling and directing circulation.

10. A new and improved apparatus for the treatment of hydrocarbons comprising a vertically disposed main chamber of cylindrical formation, a plurality of heating units for heating hydrocarbons, said units being arranged in radial relation with respect to the main chamber, each unit comprising a header in the form of a vertically disposed cylindrical chamber standing in substantially parallel relation to the main chamber, a group of heating and circulating tubes extending from one end of said header and communicating with a corresponding portion of the main chamber, and a second group of heating and circulating tubes extending from the other end of said header and communicating with a corresponding portion of the main chamber, means for heating the tubes of each unit, and mechanical means for inducing, controlling and directing circulation.

11. A new and improved apparatus for the treatment of hydrocarbons comprising a main chamber, a plurality of heating units for heating hydrocarbons, said units being arranged in radial relation with respect to the main chamber, each unit comprising a header, a group of heating and circulating tubes extending from one end of said header and communicating with a corresponding portion of the main chamber, and a second group of heating and circulating tubes extending from the other end of said header and communicating with a corresponding portion of the main chamber, means for heating the tubes of each unit, and a pump for inducing, controlling and directing circulation.

12. A new and improved apparatus for the treatment of hydrocarbons comprising a vertically disposed main chamber of cylindrical formation, a plurality of heating units for heating hydrocarbons, said units being arranged in radial relation with respect to the main chamber, each unit comprising a header in the form of a vertically disposed cylindrical chamber standing in substantially parallel relation to the main chamber, a group of heating and circulating tubes extending from one end of said header and communicating with a corresponding portion of the main chamber, and a second group of heating and circulating tubes extending from the other end of said header and communicating with a corresponding portion of the main chamber, means for heating the tubes of each unit, and a pump for inducing, controlling and directing circulation.

13. A new and improved apparatus for the treatment of hydrocarbons comprising a main centrally disposed vertically standing cylindrical chamber, a plurality of heating units for heating hydrocarbon arranged in radial relation with respect to the main chamber and each comprising a vertically standing header of cylindrical formation, a lower group of heating and circulating tubes connected with the lower portion of the header and communicating with the main chamber above the base thereof to afford a lower pool or zone below the circulating zone, an upper group of heating and circulating tubes leading from the upper portion of each header and communicating with a corresponding portion of the main chamber, and means for heating the tubes of each unit.

14. A new and improved apparatus for the treatment of hydrocarbons comprising a main centrally disposed vertically standing cylindrical chamber, a plurality of heating units for heating hydrocarbon, arranged in radial relation with respect to the main chamber and each comprising a vertically standing header of cylindrical formation, a lower group of heating and circulating tubes connected with the lower portion of the header and communicating with the main chamber above the base thereof to afford a lower pool or zone below the circulating zone, an upper group of heating and circulating tubes leading from the upper portion of each header and communicating with a corresponding portion of the main chamber, means for heating the tubes of each unit, and means for inducing, controlling and directing circulation through each of the heating units.

15. A new and improved apparatus for the treatment of hydrocarbons comprising a main centrally disposed vertically standing cylindrical chamber, a plurality of heating units for heating hydrocarbon, arranged in radial relation with respect to the main chamber and each comprising a vertically standing header of cylinder formation, a lower group of heating and circulating tubes connected with the lower portion of the header and communicating with the main chamber above the base thereof to afford a lower pool or zone below the circulating zone, an upper group of heating and circulating tubes leading from the upper portion of each header and communicating with a corresponding portion of the main chamber, means for heating the tubes of each unit, means for inducing, controlling and directing circulation through each of the heating units, means for withdrawing material from the pool at the bottom of the main chamber, and means for introducing a treatment agent into the main chamber.

16. A new and improved apparatus for the treatment of hydrocarbons comprising a main centrally disposed vertically extending chamber of cylindrical formation, a plurality of heating units for heating hydrocarbons, said units being arranged in radial relation with respect to the main chamber and each unit comprising an inner vertically disposed header in relatively close relation to and parallel with the main chamber, an outer header of similar formation more distantly disposed from the main chamber, a group of lower heating and circulating tubes connecting the lower portions of the two headers and a similar upper group of heating and circulating tubes connecting the upper portions of the headers, lower and upper connections between each of the inner headers and a corresponding portion of the main chamber, and means for heating the tubes of each heating unit.

17. A new and improved apparatus for the treatment of hydrocarbons comprising a main centrally disposed vertically extending chamber of cylindrical formation, a plurality of heating units for heating hydrocarbons, said units being arranged in radial relation with respect to the main chamber and each unit comprising an inner vertically disposed header in relatively close relation to and parallel with the main chamber, an outer header of similar formation more distantly disposed from the main chamber, a group of lower heating and circulating tubes connecting the lower portions of the two headers and a similar upper group of heating and circulating tubes connecting the upper portions of the headers, lower and upper connections between each of the inner headers and a corresponding portion of the main chamber, means for heating the tubes of each heating unit, the lower connections between the several units and the main chamber opening into the latter at a point substantially above the base thereof to afford a pool below the circulating zone for the accumulation of heavy material, and means for withdrawing said accumulated material from said pool.

18. A new and improved apparatus for the treatment of hydrocarbons comprising a vertically disposed main chamber of cylindrical formation, a plurality of heating units for heating hydrocarbons, said units being arranged in radial relation with respect to the main chamber, each unit comprising a header in the form of a vertically disposed cylindrical chamber standing in substantially parallel relation to the main chamber, a group of heating and circulating tubes extending from one end of said header and communicating with a corresponding portion of the main chamber, and a second group of heating and circulating tubes extending from the other end of said header and communicating with a corresponding portion of the main chamber, means for heating the tubes of each unit, the main chamber being extended above the circulating zone and laterally enlarged to afford a vapor releasing chamber, and a dephlegmator section superposed above and in direct communication with the vapor releasing chamber.

19. A new and improved apparatus for the treatment of hydrocarbons comprising a main centrally disposed vertically extending chamber of cylindrical formation, a plurality of heating units for heating hydrocarbons, said units being arranged in radial relation with respect to the main chamber and each unit comprising an inner vertically disposed header in relatively close relation to and parallel with the main chamber, an outer header of similar formation more distantly disposed from the main chamber, a group of lower heating and circulating tubes connecting the lower portions of the two headers and a similar upper group of heating and circulating tubes connecting the upper portions of the headers, lower and upper connections between each of the inner headers and a corresponding portion of the main chamber, means for heating the tubes of each heating unit, the main chamber being extended above the circulating zone and laterally enlarged to afford a vapor releasing chamber, and a dephlegmator section superposed above and in direct communication with the vapor releasing chamber.

20. A new and improved apparatus for the treatment of hydrocarbons comprising a main centrally disposed vertically extending chamber of cylindrical formation, a plurality of heating units for heating hydrocarbons, said units being arranged in radial relation with respect to the main chamber and each unit comprising an inner vertically disposed header in relatively close relation to and parallel with the main chamber, an outer header of similar formation more distantly disposed from the main chamber, a group of lower heating and circulating tubes connecting the lower portions of the two headers and a similar upper group of heating and circulating tubes connecting the upper portions of the headers, lower and upper connections between each of the inner headers and a corresponding portion of the main chamber, means for heating the tubes of each heating unit, the lower connections between the several units and the main chamber opening into the latter at a point substantially above the base thereof to afford a pool below the circulating zone for the accumulation of heavy material, means for withdrawing said accumulated material from said pool, the main chamber being extended above the circulating zone and laterally enlarged to afford a vapor releasing chamber, and a dephlegmator section superposed above and in direct communication with the vapor releasing chamber.

In testimony whereof, I have hereunto set my hand this 13th day of June, 1929.

HOMER T. DARLINGTON.